（12）United States Patent
Zakharchenko et al.

(10) Patent No.: US 11,973,987 B2
(45) Date of Patent: Apr. 30, 2024

(54) EFFICIENT PATCH ROTATION IN POINT CLOUD CODING

(71) Applicant: Huawei Technologies Co., Ltd., Shenzhen (CN)

(72) Inventors: Vladyslav Zakharchenko, San Diego, CA (US); Dejun Zhang, Beijing (CN); Kangying Cai, Beijing (CN); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 17/369,408

(22) Filed: Jul. 7, 2021

(65) Prior Publication Data
US 2021/0337237 A1 Oct. 28, 2021

Related U.S. Application Data

(63) Continuation of application No. PCT/US2020/013348, filed on Jan. 13, 2020.

(60) Provisional application No. 62/792,259, filed on Jan. 14, 2019.

(51) Int. Cl.
*H04N 19/70* (2014.01)
*H04N 19/17* (2014.01)
*H04N 19/597* (2014.01)
*H04N 19/85* (2014.01)

(52) U.S. Cl.
CPC ............. *H04N 19/70* (2014.11); *H04N 19/17* (2014.11); *H04N 19/597* (2014.11); *H04N 19/85* (2014.11)

(58) Field of Classification Search
None
See application file for complete search history.

(56) References Cited

U.S. PATENT DOCUMENTS

| 2014/0320492 | A1 | 10/2014 | Jiang et al. |
| 2017/0094262 | A1 | 3/2017 | Peterson et al. |
| 2018/0197329 | A1 | 7/2018 | Palais et al. |
| 2018/0268570 | A1 | 9/2018 | Budagavi et al. |
| 2019/0110076 | A1 | 4/2019 | Lim et al. |

FOREIGN PATENT DOCUMENTS

| CN | 109155854 A | 1/2019 |
| EP | 3301916 A1 | 4/2018 |
| WO | 2017204185 A1 | 11/2017 |

(Continued)

OTHER PUBLICATIONS

Cheng, et al., "[PCC] Adaptive Method of Patch Rotating for TMC2," ISO/IEC JTC1/SC29/WG11 MPET2018/m43783, Jul. 2018, Ljubljana, SI, 4 pages.

(Continued)

*Primary Examiner* — Christopher Braniff
(74) *Attorney, Agent, or Firm* — Conley Rose, P.C.

(57) ABSTRACT

A method of point cloud coding (PCC) implemented by a decoder is provided. The method includes receiving, by a receiver of the decoder, a bitstream containing a patch rotation enabled flag and atlas information for a two dimensional (2D) patch; determining, by a processor of the decoder, that the 2D patch is capable of being rotated based on the patch rotation enabled flag; rotating, by the processor, the 2D patch; and reconstructing, by the processor, a three dimensional (3D) image using the atlas information and the 2D patch as rotated.

22 Claims, 12 Drawing Sheets

(56) References Cited

FOREIGN PATENT DOCUMENTS

WO 2020065419 A1 4/2020

OTHER PUBLICATIONS

Zhang, et al., "A Patch Axis Swap Method for TMC2," ISO/IEC JTC1/SC29/WG11 MEPG2018/m43809, Jul. 2018, Beijing, China, 3 pages.

Graziosi, "[PCC] TMC2 Patch Flexible Orientation," ISO/IEC JTC1/SC29/WG11 MPEG2018/m43680, Jul. 2018, Ljubljana, SI, 4 pages.

Zakharchenko, et al., "[V-PCC] [CE2.18 Related] Results of BoG Discussion on Patch Rotation," ISO/IEC JTC1/SC29/ WG11 m46532, Jan. 2019, Marrakech, MA 6 pages.

Yiling, et al., "Introduction to Point Cloud Compression," In: Publications/ZTE Communicaitons/No. 3, Oct. 23, 2018, [online] [retrieved on Mar. 25, 2020 (Mar. 25, 2020)] Retrieved from the Internet , URL: https//www.zte.com.cn/global/about/magazine/zte-communications/2018/En201803/SpecialTopic/XUYiling.html>, 6 pages.

Tsai, Y., et al., "[PCC] CE2.18 Report on adaptive method of patch rotating", International Organisation for Standardisation Organisation Internationale De Normalisation ISO/IEC JTC1/SC29/WG11 MPEG2018/M44963, Oct. 2018, 4 pages.

Graziosi, D., "PCC CE2.18-related newcontribution—Packing Strategy Signaling", International Organisation for Standardisation Organisation Internationale De Normalisation ISO/IEC JTC1/SC29/WG11 MPEG2018/m44906, Oct. 2018, 4 pages.

"Series H: Audiovisual and Multimedia Systems; Infrastructure of audiovisual services—Coding of moving video; High efficiency video coding" Recommendation ITU-T H.265, Apr. 2013, 317 pages.

EFFICIENT PATCH ROTATION IN POINT CLOUD CODING

CROSS-REFERENCE TO RELATED APPLICATIONS

This application is a continuation of International Application No. PCT/US2020/013348 filed on Jan. 13, 2020, by Futurewei Technologies, Inc., and titled "Efficient Patch Rotation in Point Cloud Coding," which claims the benefit of U.S. Provisional Patent Application No. 62/792,259, filed Jan. 14, 2019, by Vladyslav Zakharchenko, et al., and titled "Point Cloud Bitstream Structure and Auxiliary Information Differential Coding," which is hereby incorporated by reference.

TECHNICAL FIELD

The present disclosure is generally related to point cloud coding, and is specifically related to the high-level syntax for point cloud coding.

BACKGROUND

The point cloud is employed in a wide variety of applications including entertainment industry, intelligent automobile navigation, geospatial inspection, three dimensional (3D) modeling of real world objects, visualization etc. Considering the non-uniform sampling geometry of the point cloud, compact representations for storage and transmission of such data is useful. Compared with the other 3D presentations, the irregular point cloud is more general and applicable for a wider range of sensors and data acquisition strategies. For example, when performing a 3D presentation in a virtual reality world or remote renderings in a telepresence environment, the rendering of virtual figures and real-time instructions are processed as a dense point cloud data set.

SUMMARY

A first aspect relates to a method of point cloud coding (PCC) implemented by a decoder. The method includes receiving, by a receiver of the decoder, a bitstream containing a patch rotation enabled flag and atlas information for a two dimensional (2D) patch; determining, by a processor of the decoder, that the 2D patch is capable of being rotated based on the patch rotation enabled flag; rotating, by the processor, the 2D patch; and reconstructing, by the processor, a three dimensional (3D) image using the atlas information and the 2D patch as rotated.

Using this flexible patch orientation scheme, patches may be more efficiently packed into a bounding box. Because of the more efficient packing, the area occupied by the patches within the bounding box may be reduced relative to techniques where patch rotation is not available or permitted, which results in better coding efficiency (e.g., less bits are needed to code the bitstream).

In a first implementation form of the method according to the first aspect as such, the bitstream contains a default patch rotation and a preferred patch rotation, and wherein the 2D patch is rotated according to the default patch rotation or the preferred patch rotation.

In a second implementation form of the method according to the first aspect as such or any preceding implementation form of the first aspect, the bitstream contains one of a plurality of available patch rotations, and wherein the 2D patch is rotated according to the one of the plurality of available patch rotations.

In a third implementation form of the method according to the first aspect as such or any preceding implementation form of the first aspect, a three bit flag in the bitstream identifies the one of the plurality of available patch rotations.

In a fourth implementation form of the method according to the first aspect as such or any preceding implementation form of the first aspect, the bitstream contains a limited rotation enabled flag.

In a fifth implementation form of the method according to the first aspect as such or any preceding implementation form of the first aspect, the 2D patch is rotated based on an exhaustive orientation mode when the limited rotation flag has a first value and a simple orientation mode when the limited rotation flag has a second value.

In a sixth implementation form of the method according to the first aspect as such or any preceding implementation form of the first aspect, the bitstream contains a patch rotation present flag, and wherein the 2D patch is rotated according to a default patch rotation when the patch rotation present flag has a first value.

In a seventh implementation form of the method according to the first aspect as such or any preceding implementation form of the first aspect, the bitstream contains a patch rotation present flag, and wherein the 2D patch is rotated according to a preferred patch rotation or one of a plurality of available patch rotations when the patch rotation present flag has a second value.

In an eighth implementation form of the method according to the first aspect as such or any preceding implementation form of the first aspect, further comprising rotating the 2D patch according to a preferred patch rotation when the patch rotation enabled flag has a second value, a limited rotation enabled flag has the second value, and a patch rotation present flag has the second value.

In a ninth implementation form of the method according to the first aspect as such or any preceding implementation form of the first aspect, further comprising rotating the 2D patch according to a default patch rotation when the patch rotation enabled flag has a second value, a limited rotation enabled flag has the second value, and the patch rotation present flag has the first value.

In a tenth implementation form of the method according to the first aspect as such or any preceding implementation form of the first aspect, further comprising rotating the 2D patch according to the default patch rotation when the patch rotation enabled flag has a second value, the limited rotation enabled flag has a first value, and the patch rotation present flag has the first value.

In an eleventh implementation form of the method according to the first aspect as such or any preceding implementation form of the first aspect, further comprising rotating the 2D patch according to one of a plurality of available patch rotations when the patch rotation enabled flag has a second value, the limited rotation enabled flag has a first value, and the patch rotation present flag has the second value.

A second aspect relates to a method of point cloud coding (PCC) implemented by an encoder. The method includes obtaining, by a receiver of the encoder, a three dimensional (3D) image; determining, by a processor of the encoder, a plurality of two dimensional (2D) projections for the 3D image using a plurality of available patch rotations; selecting, by the processor, one of the plurality of 2D projections; setting, by the processor, a plurality of flags according to the one of the plurality of 2D projections that was selected; generating, by the processor, a bitstream containing the plurality of flags and atlas information to reconstruct the 3D image; and storing, in a memory of the encoder, the bitstream for transmission toward a decoder.

Using this flexible patch orientation scheme, patches may be more efficiently packed into a bounding box. Because of the more efficient packing, the area occupied by the patches within the bounding box may be reduced relative to techniques where patch rotation is not available or permitted, which results in better coding efficiency (e.g., less bits are needed to code the bitstream).

In a first implementation form of the method according to the second aspect as such, the plurality of flags includes a patch rotation enabled flag, a limited rotation enabled flag, and a patch rotation present flag.

In a second implementation form of the method according to the second aspect as such or any preceding implementation form of the second aspect, at least one of the plurality of flags is set to signal the decoder to use a default patch rotation.

In a third implementation form of the method according to the second aspect as such or any preceding implementation form of the second aspect, at least one of the plurality of flags is set to signal the decoder to use a preferred patch rotation.

In a fourth implementation form of the method according to the second aspect as such or any preceding implementation form of the second aspect, at least one of the plurality of flags is set to signal the decoder to use one of a plurality of available patch rotations.

A third aspect relates to a decoding device including a receiver configured to receive a coded video bitstream containing a patch rotation enabled flag and atlas information for a two dimensional (2D) patch; a memory coupled to the receiver, the memory storing instructions; and a processor coupled to the memory, the processor configured to execute the instructions to cause the decoding device to: determine that the 2D patch is capable of being rotated based on the patch rotation enabled flag; rotate the 2D patch; and reconstruct a three dimensional (3D) image using the atlas information and the 2D patch as rotated.

Using this flexible patch orientation scheme, patches may be more efficiently packed into a bounding box. Because of the more efficient packing, the area occupied by the patches within the bounding box may be reduced relative to techniques where patch rotation is not available or permitted, which results in better coding efficiency (e.g., less bits are needed to code the bitstream).

In a first implementation form of the decoding device according to the third aspect as such, the decoding device further comprises a display configured to display the 3D image.

A fourth aspect relates to encoding device, comprising: a receiver configured to receive a three dimensional (3D) image; a memory coupled to the receiver, the memory containing instructions; a processor coupled to the memory, the processor configured to implement the instructions to cause the encoding device to: determine a plurality of two dimensional (2D) projections for the 3D image using a plurality of available patch rotations; select one of the plurality of 2D projections; set a plurality of flags according to the one of the plurality of 2D projections that was selected; generate a bitstream containing the plurality of flags and atlas information to reconstruct the 3D image; and store the bitstream in the memory for transmission toward a decoder.

Using this flexible patch orientation scheme, patches may be more efficiently packed into a bounding box. Because of the more efficient packing, the area occupied by the patches within the bounding box may be reduced relative to techniques where patch rotation is not available or permitted, which results in better coding efficiency (e.g., less bits are needed to code the bitstream).

In a first implementation form of the encoding device according to the fourth aspect as such, the encoding device further comprises a transmitter coupled to the processor, the transmitter configured to transmit the bitstream toward the decoder.

A fifth aspect relates to a coding apparatus, comprising: a receiver configured to receive a volumetric picture to encode or to receive a bitstream to decode; a transmitter coupled to the receiver, the transmitter configured to transmit the bitstream to a decoder or to transmit a decoded volumetric image to a reconstruction device configured to reconstruct the decoded volumetric picture; a memory coupled to at least one of the receiver or the transmitter, the memory configured to store instructions; and a processor coupled to the memory, the processor configured to execute the instructions stored in the memory to perform any of the methods disclosed herein.

Using this flexible patch orientation scheme, patches may be more efficiently packed into a bounding box. Because of the more efficient packing, the area occupied by the patches within the bounding box may be reduced relative to techniques where patch rotation is not available or permitted, which results in better coding efficiency (e.g., less bits are needed to code the bitstream).

In a first implementation form of the coding apparatus according to the fifth aspect as such, the coding apparatus further comprises a display configured to display a projected image based on the decoded volumetric picture.

A sixth aspect relates to a system, comprising: an encoder; and a decoder in communication with the encoder, wherein the encoder or the decoder includes the encoding device, the decoding device, or the coding apparatus described herein.

Using this flexible patch orientation scheme, patches may be more efficiently packed into a bounding box. Because of the more efficient packing, the area occupied by the patches within the bounding box may be reduced relative to techniques where patch rotation is not available or permitted, which results in better coding efficiency (e.g., less bits are needed to code the bitstream).

A seventh aspect relates to a mean for coding, comprising receiving means configured to receive a volumetric picture to encode or to receive a bitstream to decode, reconstruct, and project; transmission means coupled to the receiving means, the transmission means configured to transmit the bitstream to a decoder or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
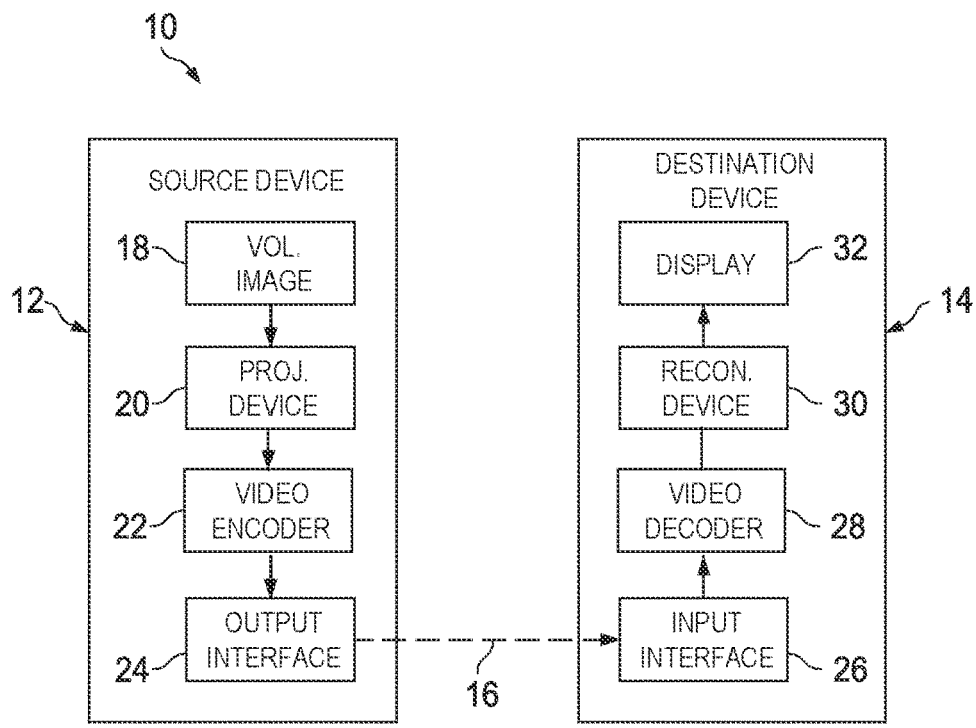
FIG. 1 is a block diagram illustrating an example coding system that may utilize context modeling techniques.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding standards include International Telecommunications Union Telecommunication Standardization Sector (ITU-T) H.261, International Organization for Standardization (ISO)/International Electrotechnical Commission (IEC) Moving Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC), and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

A point cloud is a set of data points in the 3D space. Each data point includes parameters that determine a position (e.g., X, Y, Z), a color (e.g., R, G, B or Y, U, V), and possibly other properties like transparency, reflectance, time of acquisition, etc. Typically, each point in a cloud has the same number of attributes attached to it. Point clouds may be used in various applications such as real-time 3D immersive telepresence, content virtual reality (VR) viewing with interactive parallax, 3D free viewpoint sports replay broadcasting, geographic information systems, cultural heritage, autonomous navigation based on large-scale 3D dynamic maps, and automotive applications.

The ISO/IEC Moving Picture Experts Group (MPEG) began in 2016 the development of a new codec standard on Point Cloud Coding for lossless and lossy compressed point cloud data with substantial coding efficiency and robustness to network environments. The use of this codec standard allows point clouds to be manipulated as a form of computer data and to be stored on various storage media, transmitted and received over existing and future networks and distributed on existing and future broadcasting channels.

Recently, the point cloud coding (PCC) work was classified into three categories, PCC category 1, PCC category 2, and PCC category 3, wherein two separate working drafts were being developed, one for PCC category 2 (PCC Cat2), and the other for PCC categories 1 and 3 (PCC Cat13). The latest working draft (WD) for PCC Cat2 is included in MPEG output document N17534, and the latest WD for PCC Cat13 is included in MPEG output document N17533.

The main philosophy behind the design of the PCC Cat2 codec in the PCC Cat2 WD is to leverage existing video codecs to compress the geometry and texture information of a dynamic point cloud, by compressing the point cloud data as a set of different video sequences. In particular, two video sequences, one representing the geometry information of the point cloud data and another representing the texture information, are generated and compressed by using video codecs. Additional metadata to interpret the two video sequences, i.e., an occupancy map and auxiliary patch information, is also generated and compressed separately.

Unfortunately, the existing designs of PCC have drawbacks. For example, data units pertaining to one time instance, i.e., one access unit (AU), are not contiguous in decoding order. In the PCC Cat 2 WD, the data units of texture, geometry, auxiliary information, and the occupancy map for each AU are interleaved in the units of group of frames. That is, the geometry data for all the frames in the group is together. The same is often true for texture data, and so on. In PCC Cat13 WD, the data units of geometry and the general attributes for each AU are interleaved on the level of the entire PCC bitstream (e.g., the same as in PCC Cat2 WD when there is only one group of frames that has the same length as the entire PCC bitstream). Interleaving of data units belonging to one AU inherently causes a huge end-to-end delay that is at least equal to the length of the group of frames in presentation time duration in application systems.

Another drawback relates to the bitstream format. The bitstream format allows emulation of a start code pattern like 0x0003 and therefore does not work for transmission over MPEG-2 transport stream (TS) where start code emulation prevention is needed. For PCC Cat2, currently only group_of_frames_geometry_video_payload( ) and group_of_frames_texture_video_payload( ) have start code emulation prevention in place when either HEVC or AVC is used for coding of the geometry and texture components. For PCC Cat13, start code emulation prevention is not in place anywhere in the bitstream.

In PCC Cat2 WD, some of the codec information (e.g., which codec, profile, level, etc., of the codec) for the geometry and texture bitstreams is deeply buried in the multiple instances of the structures group_of_frames_geometry_video_payload( ) and group_of_frames_texture_video_ payload( ). Furthermore, some of the information like profile and level that indicates the capabilities for decoding of the auxiliary information and occupancy map components, as well as for point cloud reconstruction, is missing.

High-level syntax designs that solve one or more of the aforementioned problems associated with point cloud coding are provided. As will be more fully explained below, the present disclosure utilizes a type indicator in a data unit header (a.k.a., a PCC network access layer (NAL) header) to specify the type of content in the payload of the PCC NAL unit. In addition, the present disclosure utilizes a group of frames header NAL unit to carry the group of frames header parameters. The group of frames header NAL unit may also be used to signal the profile and level of each geometry or texture bitstream.

FIG. 1 is a block diagram illustrating an example coding system 10 that may utilize PCC video coding techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes a video source 18 configured to provide a volumetric image, projection device 20, video encoder 22, and output interface 24. Destination device 14 includes input interface 26, video decoder 28, reconstruction device 30, and display device 32. In accordance with this disclosure, encoder 22 of the source device 12 and/or the decoder 28 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a coding device, the techniques may also be performed by an encoder/decoder, typically referred to as a "CODEC." Moreover, the techniques of this disclosure may also be performed by a video preprocessor. The encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive the volumetric image or video from a video content provider. As a further alternative, video source 18 may generate the volumetric image or computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications.

The projection device 20 is configured to project the volumetric image onto a planar surface (e.g., a bounding box) as more fully explained below. That is, the projection device 20 is configured to convert a three dimensional (3D) image to a two dimensional (2D) image or images.

In any case, the volumetric image, captured video, pre-captured video, or computer-generated video may be encoded by encoder 22. The encoded video information may then be output by output interface 24 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by encoder 22, which is also used by decoder 28, that includes syntax elements that describe characteristics and/or processing of blocks and other coded units, e.g., group of pictures (GOPs).

The reconstruction device 30 is configured to convert the planar image or images back to the volumetric image as more fully explained below. That is, the reconstruction device 30 is configured to convert the 2D image or images back to a 3D image.

Display device 32 displays the volumetric image or decoded video data to a user, and may comprise any of a variety of display devices such as a cathode ray tube (CRT), a liquid crystal display (LCD), a plasma display, an organic light emitting diode (OLED) display, or another type of display device.

Encoder 22 and decoder 28 may operate according to a video coding standard, such as the High Efficiency Video Coding (HEVC) standard presently under development, and may conform to the HEVC Test Model (HM). Alternatively, encoder 22 and decoder 28 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, encoder 22 and decoder 28 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Encoder 22 and decoder 28 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of encoder 22 and decoder 28 may be included in one or more encoders or decoders, either of which may be integrated as part of a combined encoder/decoder (CODEC) in a respective device. A device including encoder 22 and/or decoder 28 may comprise an integrated circuit, a microprocessor, and/or a wireless communication device, such as a cellular telephone.

Figure 2:
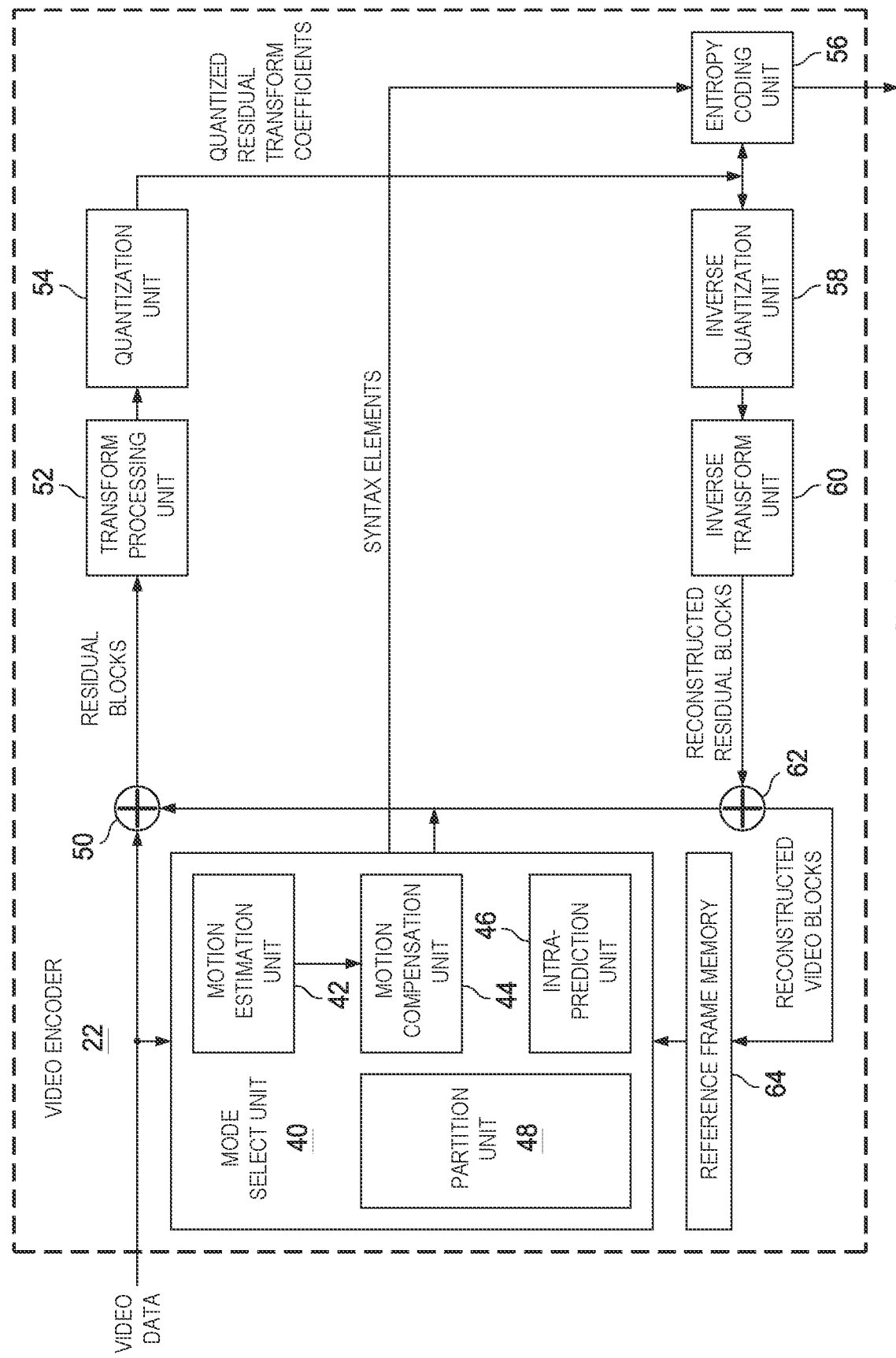
FIG. 2 a block diagram illustrating an example encoder that may implement context modeling techniques.

FIG. 2 is a block diagram illustrating an example of encoder 22 that may implement video coding techniques. Encoder 22 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, encoder 22 receives a current video block within a video frame to be encoded. In the example of FIG. 2, encoder 22 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, encoder 22 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, encoder 22 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Encoder 22 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, encoder 22 may calculate values for sub-integer pixel positions of reference pictures stored in reference frame memory 64. For example, encoder 22 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by decoder 28 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Encoder 22 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Encoder 22 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., decoder 28) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
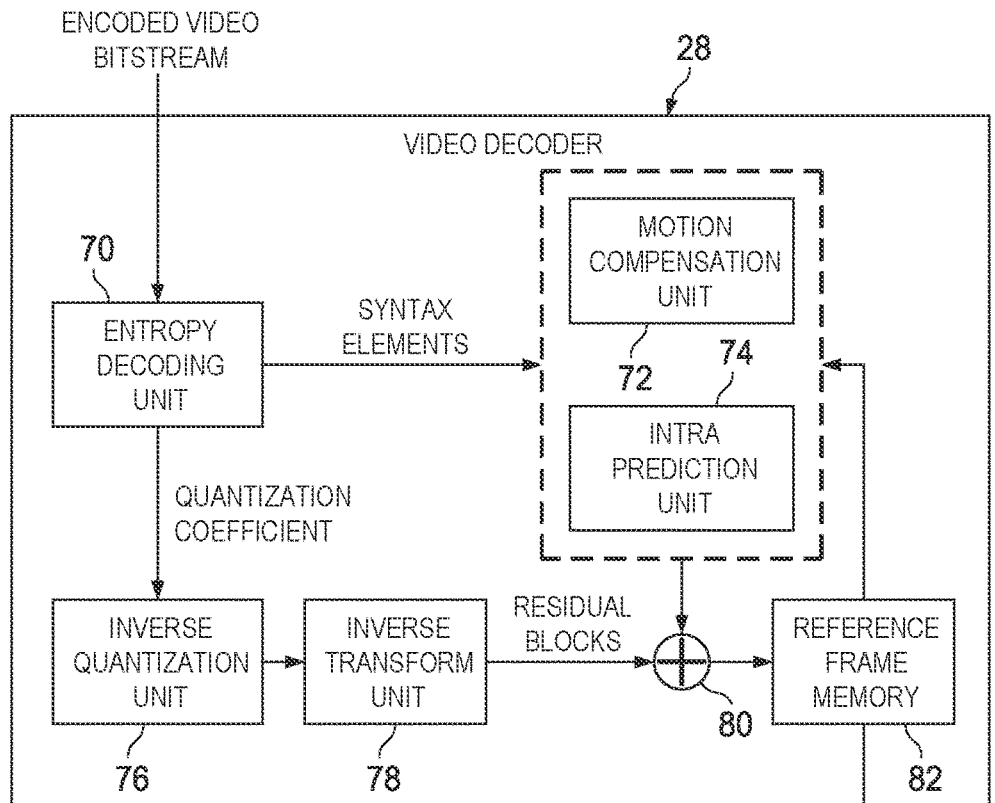
FIG. 3 a block diagram illustrating an example decoder that may implement context modeling techniques.

FIG. 3 is a block diagram illustrating an example of decoder 28 that may implement video coding techniques. In the example of FIG. 3, decoder 28 includes an entropy decoding unit 70, motion compensation unit 72, intra-prediction unit 74, inverse quantization unit 76, inverse transformation unit 78, reference frame memory 82, and summer 80. Decoder 28 may, in some examples, perform a decoding pass generally reciprocal to the encoding pass described with respect to encoder 22 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, decoder 28 receives an encoded video bitstream that represents video blocks of an encoded video slice and associated syntax elements from encoder 22. Entropy decoding unit 70 of the decoder 28 entropy decodes the bitstream to generate quantized coefficients, motion vectors or intra-prediction mode indicators, and other syntax elements. Entropy decoding unit 70 forwards the motion vectors and other syntax elements to motion compensation unit 72. Decoder 28 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Decoder 28 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by encoder 22 during encoding of the video blocks to calculate interpolated values for sub-integer pixels of reference blocks. In this case, motion compensation unit 72 may determine the interpolation filters used by encoder 22 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Figure 4:
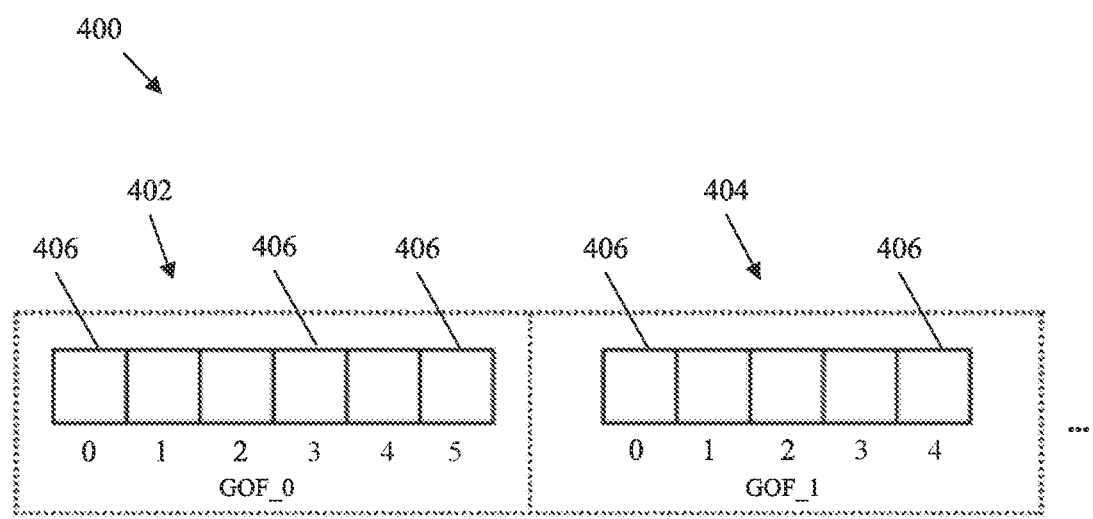
FIG. 4 is a representation of a group of frames bitstream.

FIG. 4 is a representation of a group of frames bitstream 400. As shown, the group of frames bitstream 400 includes a first group of frames 402 (GOF_0) and a second group of frames 404 (GOF_1). For the purpose of illustration only, the first group of frames 402 and the second group of frames 404 are separated from each other by dashed lines. Although two groups of frames 402, 404 are depicted in FIG. 4, it should be appreciated that any number of frames may be included in the group of frames bitstream 400 in practical applications.

The first group of frames 402 and the second group of frames 404 are each formed from a collection of access units 406. The access units 406 are configured to contain frames, which contain all or a portion of a compressed image (e.g., a point cloud). The access units 406 in FIG. 4 may contain or be referred to herein as atlas frames. In an embodiment, an atlas frame is a frame that contains sufficient information to reconstruct a point cloud by mapping coded components together, where components include point geometry, point attributes, occupancy maps, patches, etc.

Disclosed herein are coding techniques that allow for flexible patch orientation. As used herein, patch orientation contemplates rotation, mirroring, and axis swapping of a patch (collectively, rotation). Using the flexible patch orientation scheme, patches may be more efficiently packed into a bounding box. Because of the more efficient packing, the area occupied by the patches within the bounding box may be reduced relative to techniques where patch rotation is not available or permitted, which results in better coding efficiency (e.g., less bits are needed to code the bitstream).

Figure 5:
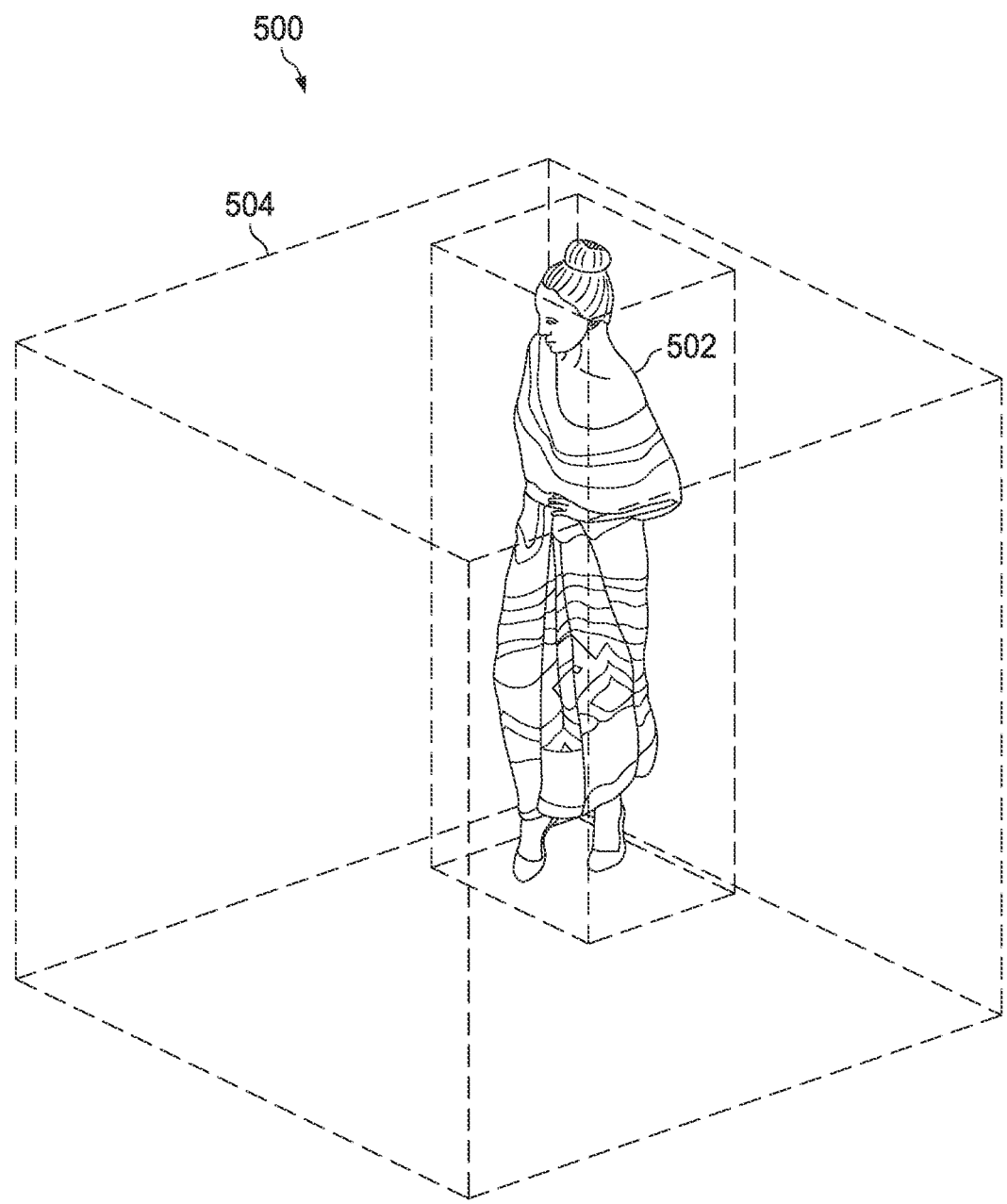
FIG. 5 is a representation of a three dimensional (3D) point cloud.

FIG. 5 is a representation of a point cloud 500. The point cloud 500 is a volumetric representation of space on a regular 3D grid. That is, the point cloud 500 is three dimensional (3D). As shown in FIG. 5, the point cloud 500 contains point cloud content 502 within 3D space 504. The point cloud content 502 is represented by a set of points (e.g., voxels) within the 3D space 504. The voxel is a volume element representing some numerical quantity, such as the color of a point in three-dimensional space, used in the visualization and analysis of three-dimensional data. Therefore, the voxel can be thought of as the three-dimensional equivalent of a pixel in a 2D image.

Each voxel in the point cloud 500 of FIG. 5 has coordinates (e.g., x y z coordinates) and one or more attributes (e.g., a red/green/blue (RGB) color component, a reflectance, etc.). While the point cloud content 502 in FIG. 5 depicts a person, the point cloud content 502 may be any other volumetric object or image in practical applications.

Figure 6:
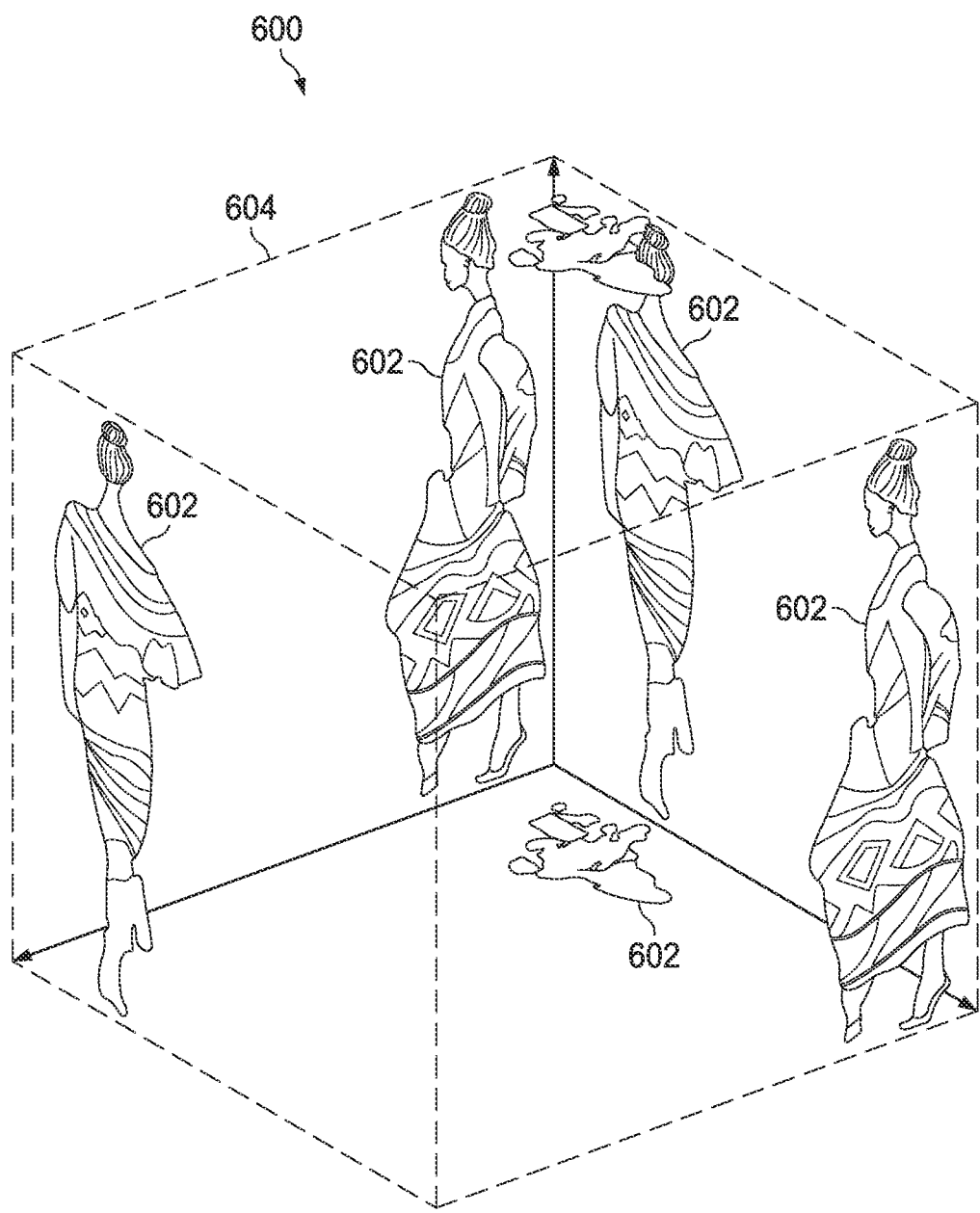
FIG. 6 is a representation of the 3D point cloud of FIG. 5 projected onto a bounding box.

FIG. 6 is a representation of the point cloud 500 of FIG. 5 projected onto a bounding box 600. As shown in FIG. 6, the bounding box 600 contains patches 602 projected onto two dimensional (2D) surfaces or planes 604 thereof. Thus, the patches 602 are 2D representations of portions of the 3D image. The patches 602 collectively correspond to the point cloud content 502 of FIG. 5. The data representation in video-based point cloud coding (V-PCC), which may also be referred to as point cloud compression, relies on this 3D to 2D conversion.

Figure 7:
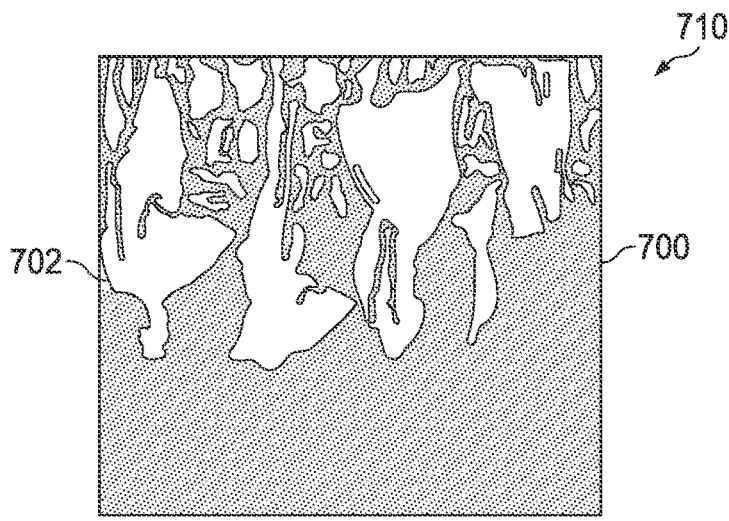
FIG. 7 is a representation of an occupancy map corresponding to the two dimensional (2D) projections from the bounding box of FIG. 6.
Figure 8:
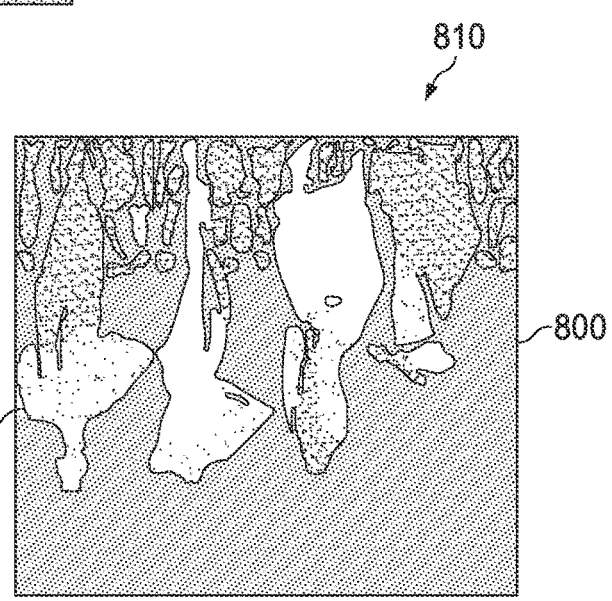
FIG. 8 is a representation of a geometry map corresponding to the 2D projections from the bounding box of FIG. 6.
Figure 9:
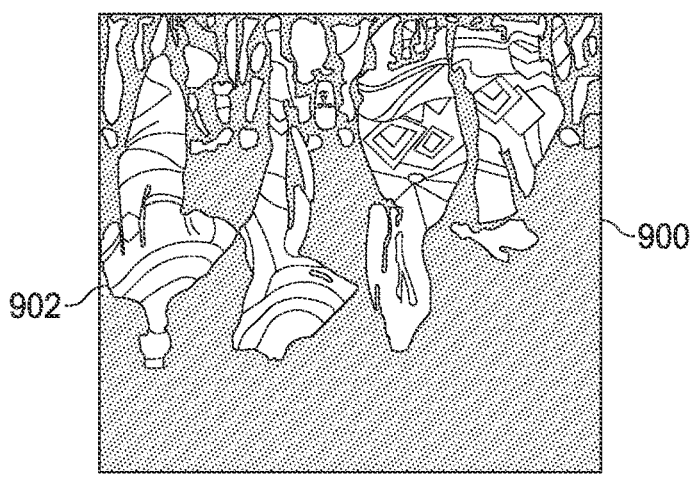
FIG. 9 is a representation of an attribute map corresponding to the 2D projections from the bounding box of FIG. 6.

The data representation in V-PCC is described as a set of planar 2D images (e.g., the patches 602) using, for example, the occupancy map 710 of FIG. 7, the geometry map 810 of FIG. 8, and the attribute map 910 of FIG. 9.

FIG. 7 is a representation of the occupancy map 710 corresponding to the 2D projections (e.g., patches 602) from the bounding box 600 of FIG. 6. The occupancy map 710 is coded in binary form. For example, a zero represents that a portion of the bounding box 700 is not occupied by one of the patches 702. Those portions of the bounding box 700 represented by the zero do not take part in reconstruction of a volumetric representation (e.g., the point cloud content 502). In contrast, a one represents that a portion of the bounding box 700 is occupied by one of the patches 702. Those portions of the bounding box 700 represented by the one do take part in reconstruction of the volumetric representation (e.g., the point cloud content 502).

FIG. 8 is a representation of the geometry map 810 corresponding to the 2D projections (e.g., patches 602) from the bounding box 600 of FIG. 6. The geometry map 810 provides or depicts the contour or topography of each of the patches 802. That is, the geometry map 810 indicates the distance of each point in the patches 802 away from the planar surface (e.g., planes 604) of the bounding box 800.

FIG. 9 is a representation of an attribute map 910 corresponding to the 2D projections (e.g., patches 602) from the bounding box 600 of FIG. 6. The attribute map 910 provides or depicts an attribute of each point in the patches 902 in the bounding box 900. The attribute in the attribute map 910 may be, for example, a color component of the point. The color component may be based on the RGB color model, the YUV color model, or based on another known color model.

Currently, patch projection (e.g., the process of projecting the 3D image 504 of FIG. 5 onto the bounding box 600 of FIG. 6 as a collection of patches 602) is performed without altering the orientation of the patches. That is, the patches are not rotated or manipulated relative to their original orientation. However, this is a sub-optimal solution for efficient packing. To overcome this, the present disclosure provides techniques that allow for flexible patch orientation (e.g., rotation, mirroring, and axis swapping of patches). Using the flexible patch orientation scheme, patches may be more efficiently packed into a bounding box. Because of the more efficient packing, the area occupied by the patches within the bounding box may be reduced relative to techniques where patch rotation is not available or permitted, which results in better coding efficiency (e.g., less bits are needed to code the bitstream).

Figure 10:
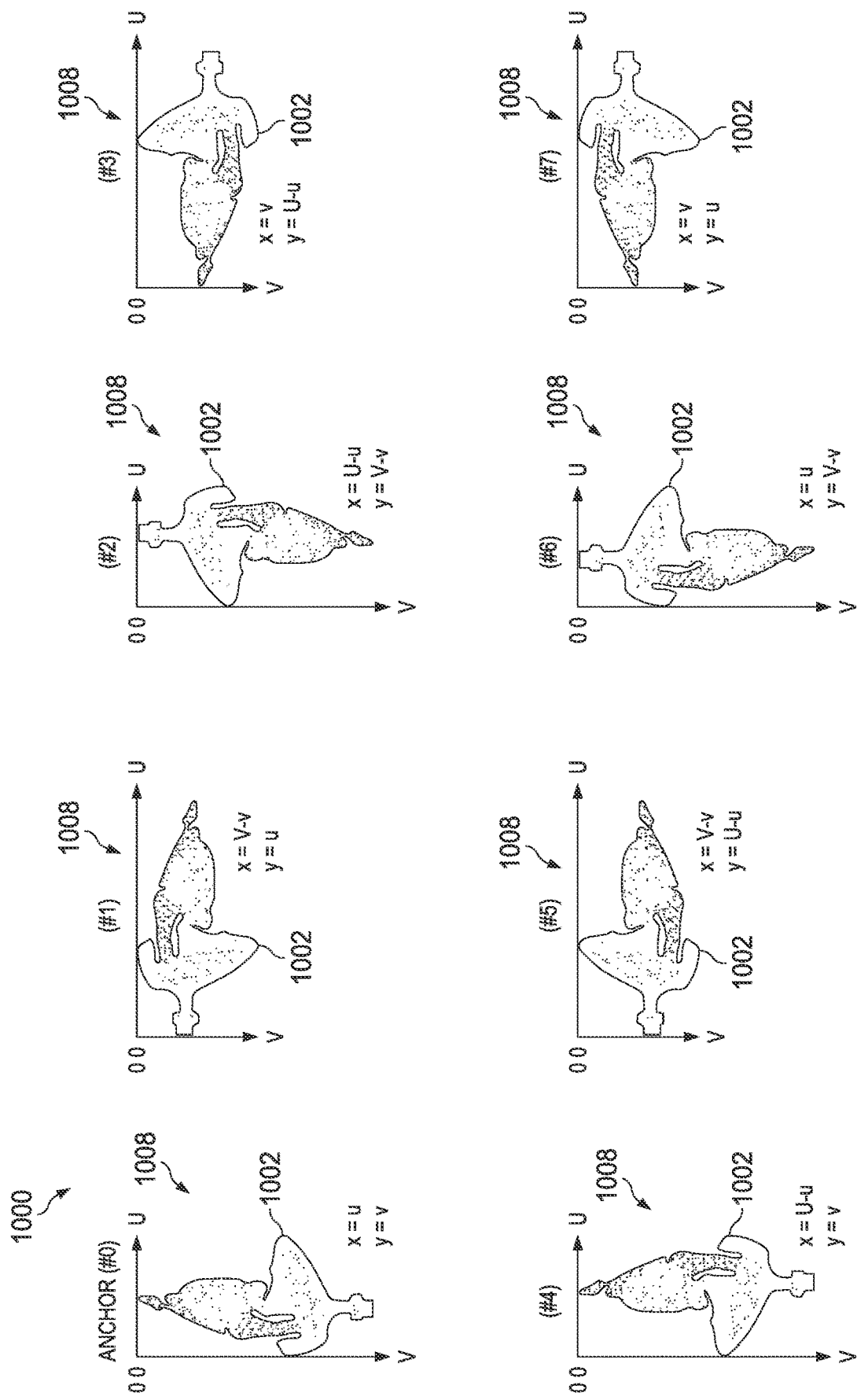
FIG. 10 is an embodiment of a representation of a patch orientation index.

FIG. 10 is an embodiment of a representation of a patch orientation index 1000. The patch orientation index 1000 includes various pre-defined patch orientations 1008 for a patch 1002. The different patch orientations 1008 in the patch orientation index 1000 are provided with numbers from #0 to #7 for the purpose of identification. The initial patch orientation 1008 assigned #0 may be referred to as the anchor patch orientation. As shown, the patch orientation 1008 assigned #0 is rotated clockwise ninety degrees to obtain the patch orientation 1008 having #1. Likewise, the patch orientation 1008 assigned #1 is rotated clockwise ninety degrees to obtain the patch orientation 1008 having #2, and the patch orientation 1008 assigned #2 is rotated clockwise ninety degrees to obtain the patch orientation 1008 having #3.

Still referring to FIG. 10, the patch orientation 1008 assigned #0 is mirrored (e.g., flipped about the vertical axis) to obtain the patch orientation 1008 having #4. The patch orientation 1008 assigned #4 is rotated clockwise ninety degrees to obtain the patch orientation 1008 having #5, the patch orientation 1008 assigned #5 is rotated clockwise ninety degrees to obtain the patch orientation 1008 having #6, and the patch orientation 1008 assigned #6 is rotated clockwise ninety degrees to obtain the patch orientation 1008 having #7.

In an embodiment, pairs of the patch orientations 1008 are formed to produce simple orientations. For example, the patch orientation 1008 assigned #0 and the patch orientation 1008 assigned #7 form a simple orientation. Likewise, the patch orientation 1008 assigned #1 and the patch orientation 1008 assigned #6 form a simple orientation, the patch orientation 1008 assigned #2 and the patch orientation 1008 assigned #5 form a simple orientation, and the patch orientation 1008 assigned #3 and the patch orientation 1008 assigned #4 form a simple orientation. As such, the patch orientation index 1000 provides four of the simple orientations.

An exhaustive orientation (a.k.a, an exhaustive orientation map) includes all of the patch orientations 1008 in the patch orientation index 1000. That is, in the illustrated embodiment of FIG. 10, all eight of the patch orientations 1008 (labeled #0 to #7) are included in the exhaustive orientation. Use of the exhaustive orientation may provide better compression relative to the simple orientation, but at the cost of extra computation at the encoder.

In an embodiment, a patch 1002 can have a default patch orientation (e.g., one of the patch orientations 1008). For example, a patch 1002 may have a default rotation. Any one of the patch orientations 1008 (e.g., from #0 to #7) can be the default rotation. The default patch orientation can be signaled in the sequence parameter set (SPS), picture parameter set (PPS), or in the group of frames (e.g., at the patch level) of the bitstream.

In an embodiment, a patch 1002 can have a preferred patch orientation (e.g., one of the patch orientations 1008). For example, a patch 1002 may have a preferred rotation. Any one of the patch orientations 1008 (e.g., from #0 to #7) can be the preferred rotation. The preferred patch orientation can be signaled in the SPS, PPS, or in the group of frames (e.g., at the patch level) of the bitstream.

In an embodiment, a flag is used to indicate that a patch (e.g., patch 1002) can be rotated. In an embodiment, the flag is designated the patch rotation enabled flag. In an embodiment, the patch rotation enabled flag is a one bit flag. When the patch rotation enabled flag has a first value (e.g., zero), the patch cannot be rotated. When the patch rotation enabled flag has a second value (e.g., one), the patch can be rotated.

In an embodiment, a flag is used to indicate that a patch (e.g., patch 1002) has the simple orientation (e.g., one of two patch orientations 1008). In an embodiment, the flag is designated the limited rotation enabled flag. In an embodiment, the limited rotation enabled flag is a one bit flag. When the limited rotation enabled flag has a first value (e.g., zero), the exhaustive orientation is available for the patch. When the limited rotation enabled flag has a second value (e.g., one), the simple orientation is available for the patch.

In an embodiment, a flag is used to indicate that a patch (e.g., patch 1002) has been rotated. In an embodiment, the flag is designated the patch rotation present flag. In an embodiment, the patch rotation present flag is a one bit flag. When the patch rotation present flag has a first value (e.g., zero), the default patch orientation is used. When the patch rotation present flag has a second value (e.g., one), then either the preferred patch orientation or one of the eight patch orientations 1008 from the exhaustive orientation is used depending on the value of the limited rotation enabled flag, as will be more fully explained below. In an embodiment, the limited rotation enabled flag is a three bit flag.

Figure 11:
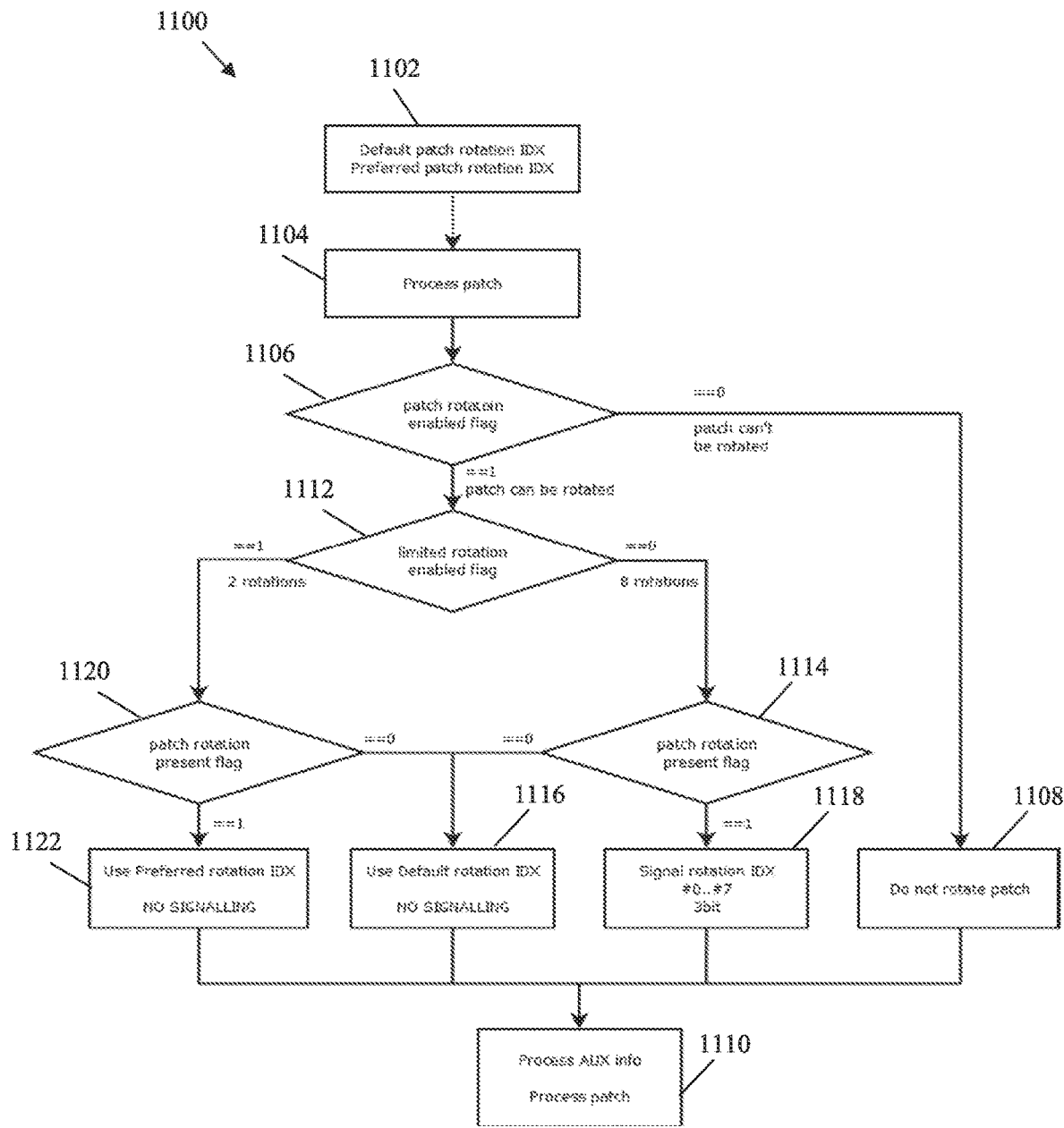
FIG. 11 is an embodiment of a patch orientation decoding process.

FIG. 11 is an embodiment of a patch orientation decoding process 1100. The patch orientation decoding process 1100 may be used to decode an encoded bitstream in order to reconstruct a volumetric image. In block 1102, the default patch rotation and the preferred patch rotation for a patch (e.g., a 2D patch) are obtained from the encoded bitstream. The default patch rotation and the preferred patch rotation may be represented by one of the index numbers #0 to #7.

In block 1104, the patch is processed. In an embodiment, processing of the patch includes obtaining atlas information, extracting a 2D location of the patch, a 3D location of the patch, and the flags described above for the patch. The atlas information is information that permits the patch to be decoded and mapped from a 2D representation to a 3D representation for the purpose of reconstruction. In an embodiment, the atlas information includes a list of the patches.

In block 1106, the value of the patch rotation enabled flag is determined. When the patch rotation enabled flag has the first value (e.g., zero), the patch cannot be rotated. Therefore, in block 1108, the patch is not rotated. Then, in block 1110, the patch is processed based on the atlas information (a.k.a., auxiliary information) to reconstruct the volumetric image.

Returning to block 1106, when the patch rotation enabled flag has the second value (e.g., one), the patch can be rotated. In block 1112, the value of the limited rotation enabled flag is determined. When the limited rotation enabled flag has the first value (e.g., zero), the patch is rotated using one of the eight available patch rotations according to an exhaustive orientation mode.

In block 1114, the value of the patch rotation present flag is determined. When the patch rotation present flag has the first value (e.g., zero), the default patch orientation is used. Therefore, in block 1116, the default rotation is used for the patch. In an embodiment, no additional signaling is needed because all patches in the group of patches use the same default patch orientation. Then, in block 1110, the patch is processed based on the atlas information to reconstruct the volumetric image.

Returning to block 1114, when the patch rotation present flag has the second value (e.g., one), one of the available orientations (represented by one of the index numbers #0 to #7) is used. In an embodiment, the patch orientation to be used is signaled using a three bit flag. Then, in block 1110, the patch is processed based on the atlas information to reconstruct the volumetric image.

Returning to block 1112, when the limited rotation enabled flag has the second value (e.g., one), the patch is rotated using one of two patch rotations according to a simple orientation mode. In block 1120, the value of the patch rotation present flag is determined. When the patch rotation present flag has the first value (e.g., zero), the default patch orientation is used. Therefore, in block 1116, the default rotation is used for the patch. In an embodiment, no additional signaling is needed because all patches in the group of patches use the same default patch orientation. Then, in block 1110, the patch is processed based on the atlas information to reconstruct the volumetric image.

When the patch rotation present flag has the second value (e.g., one), the preferred patch orientation is used. Therefore, in block 1122, the preferred rotation is used for the patch. In an embodiment, no additional signaling is needed because all patches in the group of patches use the same preferred patch orientation. Then, in block 1110, the patch is processed based on the atlas information to reconstruct the volumetric image.

Figure 12:
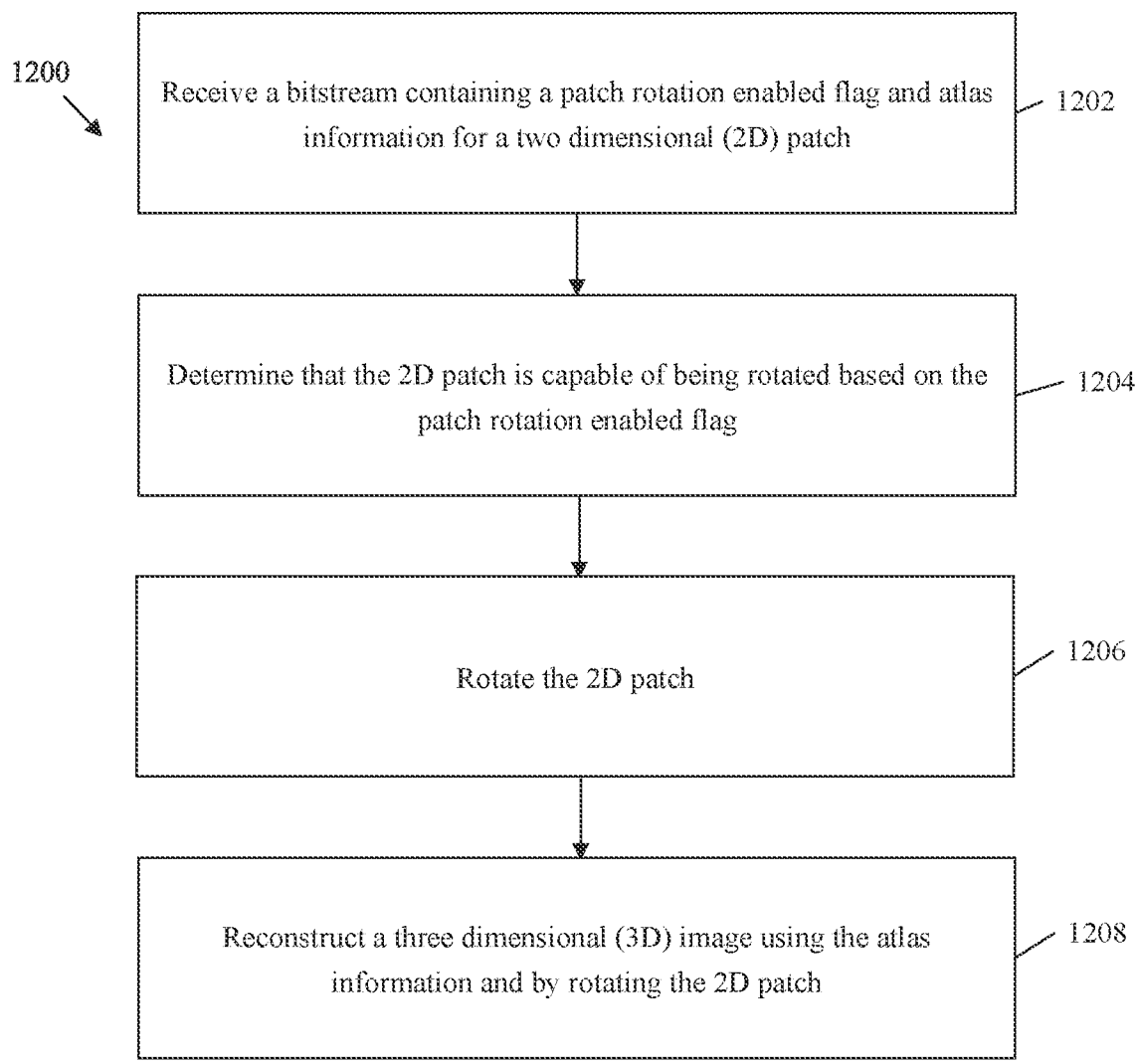
FIG. 12 is an embodiment of a method of point cloud coding (PCC) implemented by a decoder.

FIG. 12 is an embodiment of a method of point cloud coding (PCC) 1200 implemented by a decoder (e.g., entropy decoding unit 70). The method 1200 may be performed to decode an encoded bitstream in order to reconstruct a volumetric image. In block 1202, a bitstream containing a patch rotation enabled flag and atlas information for a two dimensional (2D) patch is received. The atlas information (a.k.a., auxiliary information) contains sufficient information to reconstruct a point cloud by mapping coded components together, where components include point geometry, point attributes, occupancy maps, patches, etc.

In block 1204, a determination is made that the 2D patch is capable of being rotated based on the patch rotation enabled flag. In an embodiment, when the patch rotation enabled flag is set to a value of one (1) the patch is capable of being rotated.

In block 1206, the 2D patch is rotated. The 2D patch may be rotated to a default patch rotation, a preferred patch rotation, or according to one of the plurality of available patch rotations as described herein. That is, in an embodiment the 2D patch may be rotated according to a simple orientation mode where either a default patch rotation or a preferred patch rotation is used, or according to an exhaustive orientation mode where any one of the eight available patch rotations is used.

In block 1208, a three dimensional (3D) image is reconstructed using the atlas information and the 2D patch as rotated. Once reconstructed, the 3D image may be displayed for a user on the display of an electronic device (e.g., smart phone, tablet, laptop computer, etc.).

Figure 13:
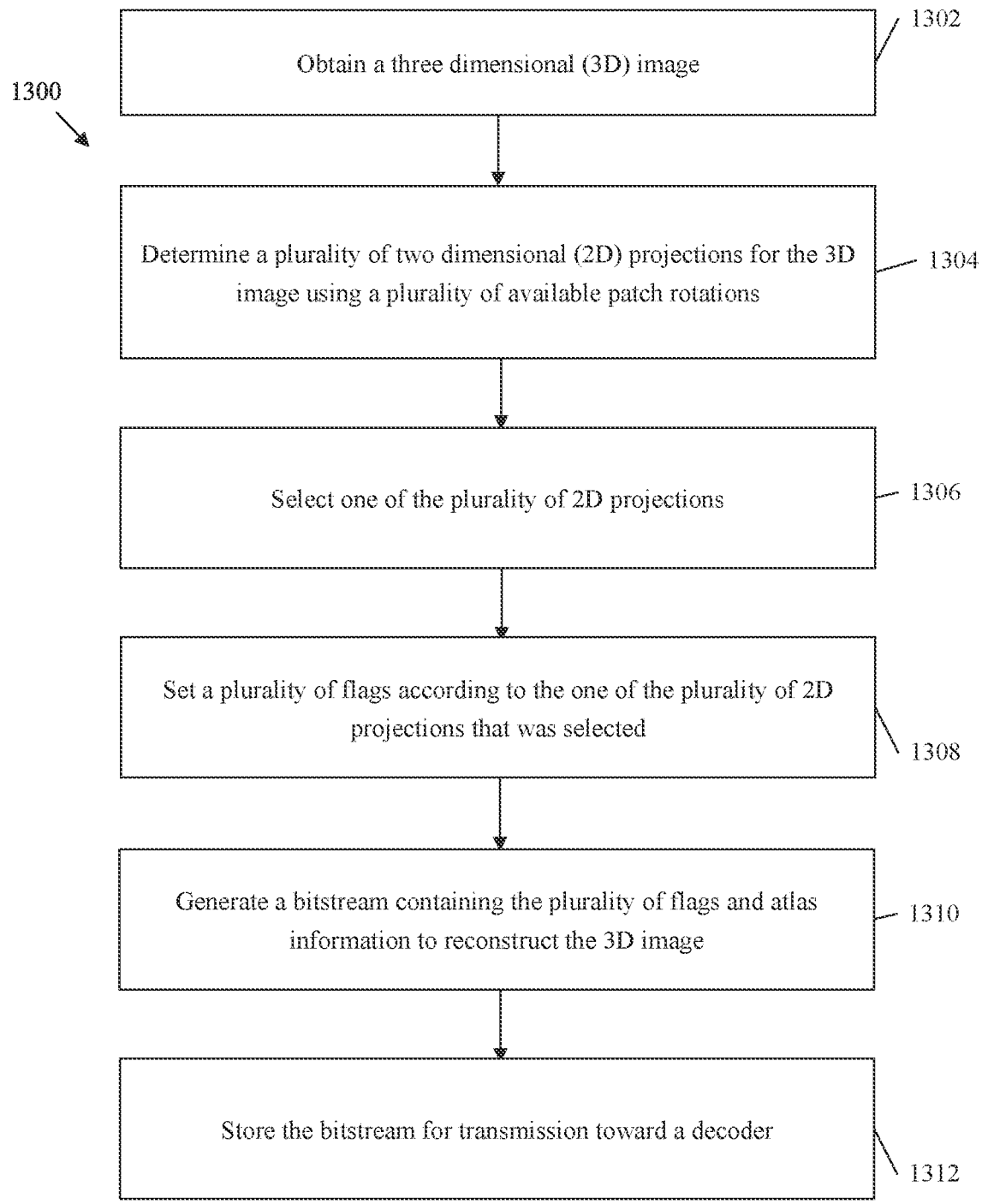
FIG. 13 is an embodiment of a method of PCC implemented by an encoder.

FIG. 13 is an embodiment of a method of point cloud coding (PCC) 1300 implemented by an encoder (e.g., entropy encoding unit 56). The method 1300 may be performed to encode a volumetric image into a bitstream for transmission toward a decoder. In block 1302, a three dimensional (3D) image (e.g., a volumetric image) is obtained. In block 1304, a plurality of two dimensional (2D) projections is determined for the 3D image using a plurality of available patch rotations. In an embodiment, the available patch rotations are the patch orientations 1008 depicted in FIG. 10. However, other patch rotations may be used.

In block 1306, one of the plurality of 2D projections is selected. The one of the plurality of 2D projections may be selected when that 2D projection results in the most efficient packing of the bounding box relative to the other 2D projections. The most efficient packing of the bounding box may use the least amount of area, may result in the least intensive computation by the encoder, and so on.

In block 1308, a plurality of flags is set according to the one of the plurality of 2D projections that was selected. In an embodiment, each of a patch rotation flag, a limited rotation enabled flag, a patch rotation present flag, and a flag that identifies which one of the plurality of available patch rotations is set.

In block 1310, a bitstream containing the plurality of flags and atlas information to reconstruct the 3D image is generated. In block 1312, the bitstream is stored for transmission toward a decoder. In an embodiment, the bitstream is transmitted toward the decoder.

Figure 14:
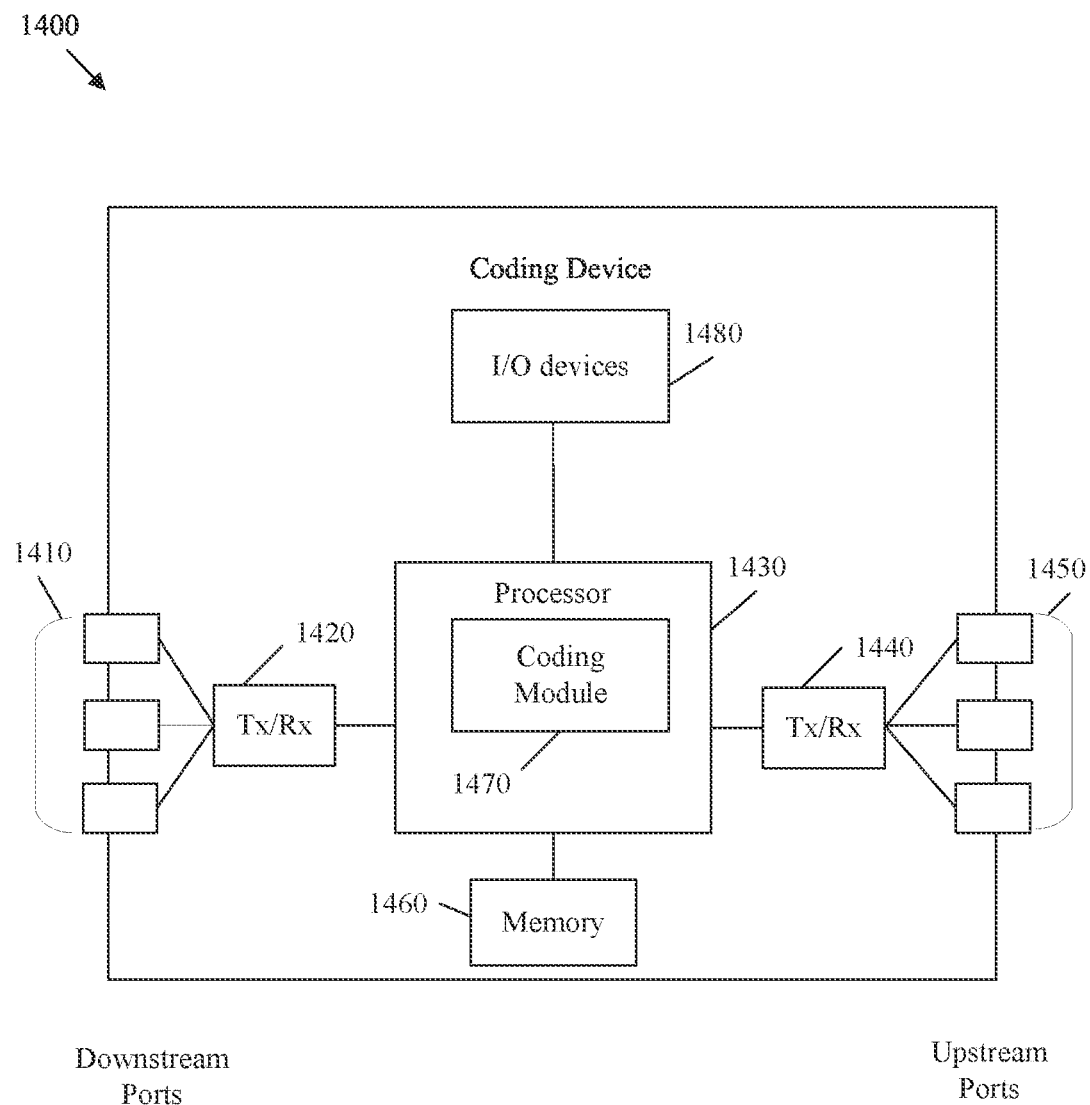
FIG. 14 is a schematic diagram of a coding device.

FIG. 14 is a schematic diagram of a coding device 1400 (e.g., an encoder 22, a decoder 28, etc.) according to an embodiment of the disclosure. The coding device 1400 is suitable for implementing the methods and processes disclosed herein. The coding device 1400 comprises ingress ports 1410 and receiver units (Rx) 1420 for receiving data; a processor, logic unit, or central processing unit (CPU) 1430 to process the data; transmitter units (Tx) 1440 and egress ports 1450 for transmitting the data; and a memory 1460 for storing the data. The coding device 1400 may also comprise optical-to-electrical (OE) components and electrical-to-optical (EO) components coupled to the ingress ports 1410, the receiver units 1420, the transmitter units 1440, and the egress ports 1450 for egress or ingress of optical or electrical signals.

The processor 1430 is implemented by hardware and software. The processor 1430 may be implemented as one or more CPU chips, cores (e.g., as a multi-core processor), field-programmable gate arrays (FPGAs), application specific integrated circuits (ASICs), and digital signal processors (DSPs). The processor 1430 is in communication with the ingress ports 1410, receiver units 1420, transmitter units 1440, egress ports 1450, and memory 1460. The processor 1430 comprises a coding module 1470. The coding module 1470 implements the disclosed embodiments described above. In an embodiment, the coding module 1470 is a reconstruction module configured to project a reconstructed volumetric image. The inclusion of the coding module 1470 therefore provides a substantial improvement to the functionality of the coding device 1400 and effects a transformation of the coding device 1400 to a different state. Alternatively, the coding module 1470 is implemented as instructions stored in the memory 1460 and executed by the processor 1430.

The coding device 1400 may also include input and/or output (I/O) devices 1480 for communicating data to and from a user. The I/O devices 1480 may include output devices such as a display for displaying video data, speakers for outputting audio data, etc. The I/O devices 1480 may also include input devices, such as a keyboard, mouse, trackball, etc., and/or corresponding interfaces for interacting with such output devices.

The memory 1460 comprises one or more disks, tape drives, and solid-state drives and may be used as an overflow data storage device, to store programs when such programs are selected for execution, and to store instructions and data that are read during program execution. The memory 1460 may be volatile and non-volatile and may be read-only memory (ROM), random-access memory (RAM), ternary content-addressable memory (TCAM), and static random-access memory (SRAM).

Figure 15:
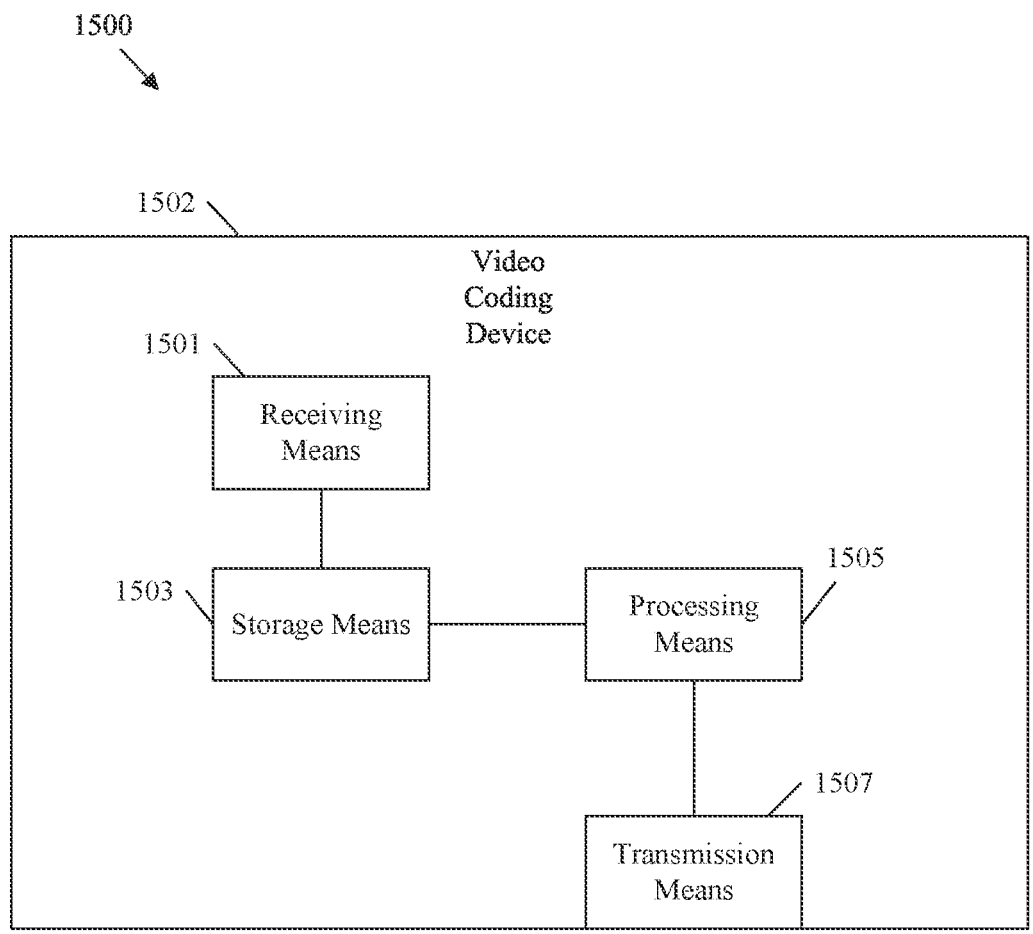
FIG. 15 is a schematic diagram of an embodiment of a means for coding.

FIG. 15 is a schematic diagram of an embodiment of a means for coding 1500. In embodiment, the means for coding 1500 is implemented in a coding device 1502 (e.g., an encoder 22 or a decoder 28). The coding device 1502 includes receiving means 1501. The receiving means 1501 is configured to receive a picture to encode or to receive a bitstream to decode. The coding device 1502 includes transmission means 1507 coupled to the receiving means 1501. The transmission means 1507 is configured to transmit the bitstream to a decoder or to transmit a decoded image to a display means (e.g., one of the I/O devices 1480).

The coding device 1502 includes a storage means 1503. The storage means 1503 is coupled to at least one of the receiving means 1501 or the transmission means 1507. The storage means 1503 is configured to store instructions. The coding device 1502 also includes processing means 1505. The processing means 1505 is coupled to the storage means 1503. The processing means 1505 is configured to execute the instructions stored in the storage means 1503 to perform the methods disclosed herein.

In an embodiment, syntax suitable for implementing the concepts disclosed herein is provided.

Possible syntax definition is described below.

```
sequence_parameter_set( ) {
...
    auxiliary_information_orientation_enabled_flag                    u(1)
    if (auxiliary_information_orientation_enabled_flag) {
        auxiliary_information_default_orientation_enabled_flag        u(1)
        if (auxiliary_information_default_orientation_enabled_flag) {
            auxiliary_information_default_orientation_idx             u(3)
        }
        auxiliary_information_preferred_orientation_enabled_flag      u(1)
        if (auxiliary_information_default_orientation_enabled_flag) {
            auxiliary_information_preferred_orientation_idx           u(3)
        }
    }
...
}
```

Auxiliary Information Data Unit Modifications

| | Descriptor |
|---|---|
| auxiliary_information_data_unit( ) { | |
| ... | |
|   if(auxiliary_information_orientation_enabled_flag) | |
|     auxiliary_information_patch_orientation_present_flag | u(1) |
| ... | |
|   for( p = 0; p <= patch_count_minus1; p++) { | |
|     patch_2d_shift_u[ p ] | ae(v) |
|     patch_2d_shift_v[ p ] | ae(v) |
|     if (auxiliary_information_patch_orientation_present_flag) { | |
|       if(auxiliary_information_default_orientation_enabled_flag) { | |
|         patch_orientation_index[ p ] = auxiliary_information_default_orientation_idx | |
|       } | |
|       if(auxiliary_information_preferred_orientation_enabled_flag) { | |
|         patch_orientation_index[ p ] | ae(1) |
|       } else { | |
|         patch_orientation_index[ p ] | ae(v) |
|     } | |
|     patch_3d_shift_tangent_axis[ p ] | ae(v) |
| ... | |
| } | |

From the foregoing, it should be recognized that the orientation of the patch may be different for the default projection process. The orientation of the patch may be signaled in a simplified manner using 1-bit flag. The mechanism to switch between default and preferred orientation is introduced.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method of point cloud coding (PCC) implemented by a decoder, comprising:
receiving a bitstream containing a limited rotation enabled flag and atlas information for a two dimensional (2D) patch;
rotating the 2D patch based on an exhaustive orientation mode when the limited rotation enabled flag has a first value and a simple orientation mode when the limited rotation enabled flag has a second value; and
reconstructing a three dimensional (3D) image using the atlas information and the 2D patch as rotated.

2. The method of claim 1, wherein the bitstream contains a default patch rotation and a preferred patch rotation, and wherein the 2D patch is rotated according to the default patch rotation or the preferred patch rotation.

3. The method of claim 1, wherein the bitstream contains one of a plurality of available patch rotations, and wherein the 2D patch is rotated according to the one of the plurality of available patch rotations.

4. The method of claim 3, wherein a three bit flag in the bitstream identifies the one of the plurality of available patch rotations.

5. The method of claim 1, wherein the bitstream contains a patch rotation present flag, and wherein the 2D patch is rotated according to a default patch rotation when the patch rotation present flag has a first value.

6. The method of claim 1, wherein the bitstream contains a patch rotation present flag, and wherein the 2D patch is rotated according to a preferred patch rotation or one of a plurality of available patch rotations when the patch rotation present flag has a second value.

7. The method of claim 1, further comprising rotating the 2D patch according to a preferred patch rotation when a patch rotation enabled flag has a second value, the limited rotation enabled flag has the second value, and a patch rotation present flag has the second value.

8. The method of claim 1, further comprising rotating the 2D patch according to a default patch rotation when a patch rotation enabled flag has a second value, the limited rotation enabled flag has the second value, and a patch rotation present flag has a first value.

9. The method of claim 1, further comprising rotating the 2D patch according to a default patch rotation when a patch rotation enabled flag has a second value, the limited rotation enabled flag has a first value, and a patch rotation present flag has a first value.

10. The method of claim 1, further comprising rotating the 2D patch according to one of a plurality of available patch rotations when a patch rotation enabled flag has a second value, the limited rotation enabled flag has a first value, and a patch rotation present flag has the second value.

11. The method of claim 1, wherein the bitstream contains a patch rotation enabled flag, and wherein the method further comprises determining that the 2D patch is capable of being rotated based on the patch rotation enabled flag.

12. A method of point cloud coding (PCC) implemented by an encoder, comprising:
obtaining a three dimensional (3D) image;
determining a plurality of two dimensional (2D) projections for the 3D image using a plurality of available patch rotations;

selecting one of the plurality of 2D projections;

setting a plurality of flags according to the one of the plurality of 2D projections that was selected, wherein the plurality of flags includes a limited rotation enabled flag set to a first value to indicate an exhaustive orientation mode for 2D patch rotation and set to a second value to indicate a simple orientation mode for 2D patch rotation;

generating a bitstream containing the plurality of flags and atlas information to reconstruct the 3D image; and storing the bitstream for transmission toward a decoder.

13. The method of claim 12, wherein the plurality of flags includes a patch rotation enabled flag, and a patch rotation present flag.

14. The method of claim 12, wherein at least one of the plurality of flags is set to signal the decoder to use a default patch rotation.

15. The method of claim 12, wherein at least one of the plurality of flags is set to signal the decoder to use a preferred patch rotation.

16. The method of claim 12, wherein at least one of the plurality of flags is set to signal the decoder to use one of the plurality of available patch rotations.

17. The method of claim 12, wherein the exhaustive orientation mode is indicated by a first patch orientation index, and wherein the simple orientation mode is indicated by a second patch orientation index.

18. A decoding device, comprising:
a receiver configured to receive a coded video bitstream containing a limited rotation enabled flag and atlas information for a two dimensional (2D) patch;
a memory coupled to the receiver, the memory storing instructions; and
one or more processors coupled to the memory, the one or more processors configured to execute the instructions to cause the decoding device to:
rotate the 2D patch based on an exhaustive orientation mode when the limited rotation enabled flag has a first value and a simple orientation mode when the limited rotation enabled flag has a second value; and
reconstruct a three dimensional (3D) image using the atlas information and the 2D patch as rotated.

19. The decoding device of claim 18, further comprising a display configured to display the 3D image.

20. The decoding device of claim 18, wherein the coded video bitstream contains a patch rotation enabled flag, and wherein the one or more processors are configured to determine that the 2D patch is capable of being rotated based on the patch rotation enabled flag.

21. An encoding device, comprising:
a receiver configured to receive a three dimensional (3D) image;
a memory coupled to the receiver, the memory storing instructions;
one or more processors coupled to the memory, the one or more processors configured to implement the instructions to cause the encoding device to:
determine a plurality of two dimensional (2D) projections for the 3D image using a plurality of available patch rotations;
select one of the plurality of 2D projections;
set a plurality of flags according to the one of the plurality of 2D projections that was selected, wherein the plurality of flags includes a limited rotation enabled flag set to a first value to indicate an exhaustive orientation mode for 2D patch rotation and set to a second value to indicate a simple orientation mode for 2D patch rotation;
generate a bitstream containing the plurality of flags and atlas information to reconstruct the 3D image; and
store the bitstream in the memory for transmission toward a decoder.

22. The encoding device of claim 21, further comprising a transmitter coupled to the one or more processors, the transmitter configured to transmit the bitstream toward the decoder.

* * * * *